Feb. 7, 1967 B. E. DOTTER, JR 3,303,462

ERROR DETECTION IN DUOBINARY DATA SYSTEMS

Filed Jan. 30, 1963

INVENTOR.
BERTON E. DOTTER JR.
BY
Lippincott, Ralls & Hendricson
ATTORNEYS

United States Patent Office
3,303,462
Patented Feb. 7, 1967

3,303,462

ERROR DETECTION IN DUOBINARY DATA SYSTEMS

Berton E. Dotter, Jr., Belmont, Calif., assignor, by mesne assignments, to Automatic Electric Laboratories, Inc., Northlake, Ill., a corporation of Delaware Filed Jan. 30, 1963, Ser. No. 255,127
5 Claims. (Cl. 340—146.1)

Figure 1:
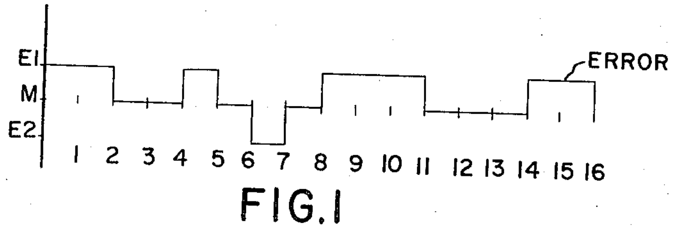

This invention relates to error detection apparatus for a new data system. More specifically, the invention provides a way of detecting data transmission errors in data transmitted by the system described in U.S. patent applications 206,747 and 245,324, both assigned to the same assignee as this invention.

The system described in the above patent applications supplies pulses representing binary data which are transmitted through a transmission channel. The bit rate of transmission is up to about four times the frequency bandwidth limit of the transmission channel. Because the data waveform is transmitted at such a high bit rate relative to the bandwidth of the transmission channel, it contains essential frequency components which the transmission channel is incapable of transmitting. Consequently, the data waveform is not transmitted through the channel in its original form. Nevertheless, there will be a received signal from which the original data can be reconstructed. The received signal has three detectable amplitude zones, or levels. These consist of two extreme levels, and one mean level between them. Adjacent pulses, however, cannot be opposite extreme levels without an intervening mean level pulse. The pattern of pulses in this new type of signal has been found to be quite unique. The extreme level of a pulse which follows one or more successive pulses of the mean amplitude level ("mean level pulses") can be predicted on the basis of the number of such successive mean level pulses. If that number is even, the next following extreme level pulse will be the same extreme level as that extreme level pulse immediately preceding the successive mean level pulses. Contrariwise, if the number of successive mean level pulses is odd, the next following extreme level pulse will be the opposite extreme level from the immediately preceding extreme level pulse.

The error detection system of this invention is quite different from conventional systems. Normally certain extra pulses, called redundancies, are introduced along with the transmitted signal. At the receiving end, these redundancies are checked for certain predetermined correspondence with the transmitted signals. If this correspondence fails to exist, errors have been made and are thus detected. Such a system has certain inherent disadvantages. First of all, additional equipment is required at the transmitting end of the system to introduce the redundancies. Similarly, extra apparatus is required at the receiver to remove them. And finally, the requirement of transmitting extra bits which contain none of the data being transmitted necessarily reduces the number of data bits which can be transmitted in the system in any given time. Thus data transmission is slowed.

Other prior art systems transmit a test pattern between transmission of data signals, designed to catch malfunctions in the system. This method, or course, also uses up valuable transmission time. Furthermore, the check is made only between data transmissions, and thus fails to detect any malfunctions developing during actual data transmission.

This invention represents a departure from the prior art discussed above in that it takes advantage of certain properties of the data itself to check for errors. No additional bits, or redundancies, need be transmitted in the system of this invention. Errors are detected during actual data transmission using the transmitted data itself for the check bits.

Briefly, the apparatus of the invention uses a binary counter to check the number of successive mean level pulses to determine if that number is even or odd. The output of this binary counter continuously predicts whether the next following extreme level pulse, whenever it occurs, will be one extreme level or the other. The apparatus also continuously monitors the transmitted extreme level pulses. Each time one occurs, it is compared with the prediction of the counter. Where predicted and actual pulses fail to agree, an error is known to have occurred. These errors may then be counted, or any other system used to indicate the degree of error recurrence. Each time an error is detected, a preferred embodiment of the invention will reverse the state of the binary counter so that the counter will be in phase with subsequent transmitted data. Then the predicted extreme level and the actual extreme level will continue to agree until the next error occurs.

One type of error counting system uses a periodically reset step counter. The step counter counts the number of errors occurring between resettings. If that number reaches a predetermined value, some kind of signal can be transmitted to indicate that the system is producing errors at a rate greater than should be tolerated. Then corrective measures can be taken, or blocks of data can be retransmitted. Usually a certain error rate is expected and tolerated. Of course the actual number per unit time varies with each system, and may also vary with the nature of the data being transmitted. Therefore, it is preferable that either the period between resettings (usually set by a clock), or the number of errors tolerated (the number which the step counter must count to have an output) be adjustable. Such a system provides a variable error threshold level.

Figure 2:
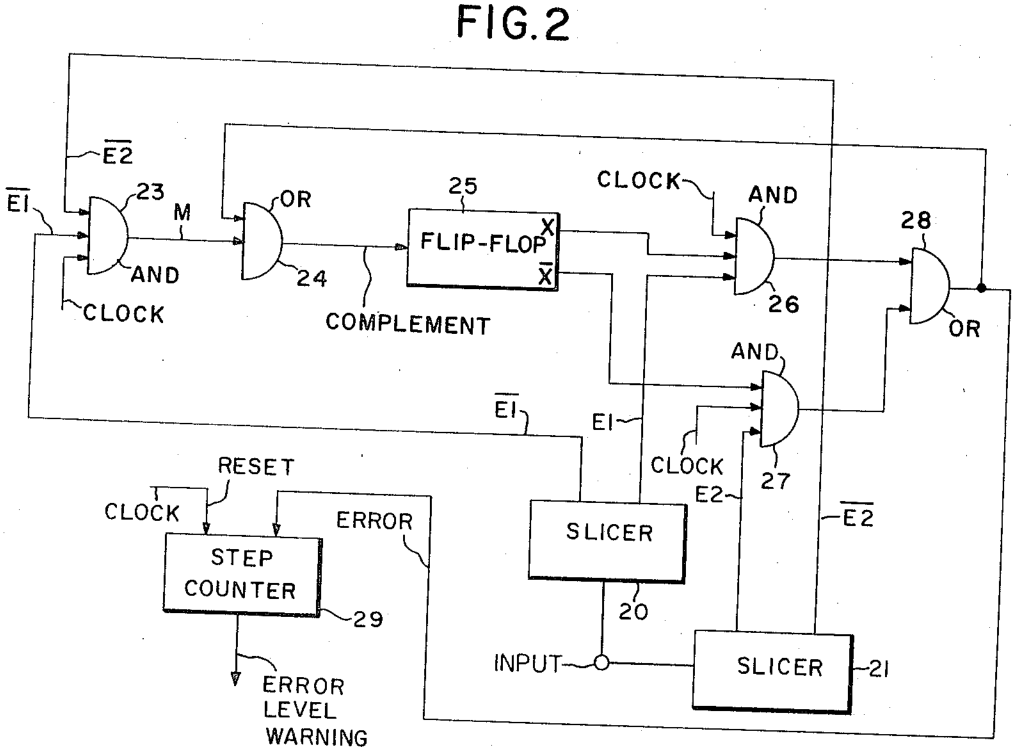

The apparatus of the invention can be more easily understood from the following more detailed description, making reference to the drawings, in which:

FIG. 1 is a graph showing an illustrative waveform of data transmitted by the system in which this invention is used (including an error); and FIG. 2 is a schematic circuit diagram of the apparatus of a preferred embodiment of this invention.

It is most important in understanding the apparatus of the invention to first fully understand the construction of the transmitted waveform. Such a waveform is shown in FIG. 1. The three amplitude levels are clearly shown. The upper extreme level is termed E1, the lower extreme level E2, and the mean level M. Logically speaking, the mean level M is the level which will always occur when the amplitude is not one of the extreme levels. Therefore, the level M can be expressed logically by the logic symbol $\overline{E1E2}$, meaning "not E1 and not E2." It is this logical expression which is used for M in the apparatus of this invention, as will be explained later.

Looking at the waveform of FIG. 1, note that the first two pulses 1 and 2 are pulses of extreme level E1. Pulses 3 and 4 are mean level, or M pulses. There are two of them—an even number. Therefore the prediction for the next extreme level pulse is that it will be the same extreme level as the last extreme level pulse immediately preceding the two successive mean level pulses. That level was E1. Note that pulse 5 which immediately follows the two successive mean level pulses 3 and 4 is in fact extreme level E1. Thus, so far, the waveform is accurate, or as predicted. As long as extreme level pulses continue to be received following pulse 5, they should remain in the same extreme level E1. Adjacent pulses cannot be of opposite extreme levels.

But the next following pulse 6 is a mean level pulse. There is only one of them (an odd number). Therefore the next extreme level pulse is predicted to be the opposite from the previous extreme level pulse, which was an E1 pulse. Sure enough, pulse 7 is an E2 pulse—the opposite from the previous E1 extreme level pulse. So far, no errors. Pulse 8 is again a single mean level pulse. Pulse 9 should therefore be the opposite extreme level from the previous (E2) extreme level pulse. And it is an E1 pulse. Pulses 10 and 11 follow pulse 9, remaining at the same E1 extreme level. Remember that adjacent pulses can never be of opposite extreme levels. There must be an intervening mean level pulse.

Successive mean level pulses 12, 13, and 14 are three in number—an odd number. The prediction then is that the next extreme level pulse will be the opposite from the last (which was E1 pulse 11). But pulse 15 is also an E1 pulse, the same as the last. Hence an error has occurred. This should be detected by the apparatus, as will be explained below.

Now referring to the apparatus shown schematically in FIG. 2, slicers 20 and 21 are used to detect the amplitude level of the signal. A slicer is a conventional amplifier switch which has an output signal when the input signal is of sufficient amplitude to turn the amplifier on. Thus slicer 20, used to detect E1 pulses, will have an E1 output when a positive E1 signal appears at its input. Otherwise, its output will be $\overline{E1}$, indicating the absence of a positive E1 signal. Similarly, slicer 21 has an E2 output whenever a negative E2 signal appears at its input. Otherwise its output indicates the absence of an E2 signal ($\overline{E2}$).

To obtain the M signal which indicates a mean level pulse, the negative outputs of slicers 20 and 21 are used. The $\overline{E1}$ and $\overline{E2}$ pulses are fed to a coincidence or AND-gate 23 along with a clock pulse. When the three pulses are coincident, meaning that a pulse was received which was neither an E1 nor an E2 pulse, the amplitude of the pulse must be M, or the mean level. The output of AND-gate 23 therefore indicates the receipt of a mean level, or M pulse. The clock pulses fed into all the AND-gates of the system serve to synchronize the slicer outputs with the transmitted data pulses. These clock pulses are obtained from a conventional clock pulse generator, synchronized in bit rate and phase with the transmitter, as is well known in the art.

The M pulses are fed through OR-gate 24 into the complement input of a trigger flip-flop 25. A trigger flip-flop is a conventional piece of logic circuitry which changes state each time a pulse is received at its complement input. Flip-flop 25 has two outputs, one indicating each of its two states. These have been designated $x$ and $\bar{x}$, or "not $x$." As will be immediately explained, these outputs are used to predict which extreme level the extreme level pulse first following after a series of mean level pulses will be. The $x$ output of flip-flop 25 is connected to AND-gate 26, where it is checked for coincidence with the E1 output of slicer 20. It must be remembered that flip-flop 25 has a memory. This means that even though no pulse is transmitted to its input, its present state will indicate the state of the flip-flop which the previous pulse at its input placed it in. Thus AND-gate 26 compares the state of flip-flop 25, as set by the last input pulse, with a pulse from slicer 20 derived from an incoming extreme level pulse. During an incoming M level pulse ($\overline{E1}\overline{E2}$), slicer 20 can have no E1 pulse, and slicer 21 can have no E2 pulse. On the other hand, during receipt of an E1 pulse, while flip-flop 25 is in the $x$ state, slicer 20 sends an E1 pulse so that AND-gate 26 will have an output.

Similarly, AND-gate 27 has one input connected to the $\bar{x}$ output of flip-flop 25 and another input connected to the E2 output of slicer 21. This AND-gate 27 checks for coincidence between an $\bar{x}$ state of flip-flop 25 and the receipt of an E2 pulse from slicer 21. The outputs of both AND-gates 26 and 27 are connected to an OR-gate 28. When OR-gate 28 has an output resulting from an output of either AND-gate 26 or AND-gate 27, an error has been detected, as follows.

Referring both to FIGS. 1 and 2, the first E1 pulse 1 is detected by slicer 20. Although it makes no difference, let us assume that flip-flop 25 was in state $x$. The first pulse must always be disregarded in the error detection system. This pulse is used to put the detection system in phase with the data. The E1 pulse from slicer 20 appears at AND-gate 26 along with a clock pulse and the continuous pulse due to the $x$ state of flip-flop 25. Thus AND-gate 26 and consequently OR-gate 28 have outputs. Normally the output of OR-gate 28 indicates an error. But the first pulse is disregarded. Note that the output of OR-gate 28 is recycled to an input of OR-gate 24 and on to the complement input of flip-flop 25. Thus flip-flop 25 will change state because of this first E1 pulse. Note further, however, that if the first pulse had been an E2 pulse (with flip-flop 25 still in the $x$ state), AND-gates 26 and 27 would each have had only one input and thus no outputs, and hence OR-gate 28 would have neither an input pulse nor an output pulse. Therefore the system would already have been in phase, and no change in the state of flip-flop 25 would have either been necessary or transpired.

The next pulse 2 (FIG. 1) is also an E1 pulse. Flip-flop 25 had been set to $\bar{x}$ by the last E1 pulse. Therefore this next E1 pulse at AND-gate 26 does not meet with an $x$ state of flip-flop 25. AND-gate 26 then has no output. AND-gate 27 also has no output (there was no E2 pulse), and therefore OR-gate 28 has no output. AND-gate 23, of course, has no output during the receipt of extreme level pulses. Flip-flop 25 thus remains unchanged.

Pulse 3 (FIG. 1) is a mean level pulse. Neither AND-gates 26 or 27 can have outputs because there are no E1 or E2 pulses. However, AND-gate 23 will have an output, passed through OR-gate 24 into the complement input of flip-flop 25. The state of flip-flop 25 now changes back from $\bar{x}$ to $x$. M level pulse 4 again changes the state of flip-flop 25—to $\bar{x}$. The fact that there were two successive M pulses (an even number) predicts that the next extreme level pulse should be the same as the last extreme level pulse, or E1. In fact, the next pulse—pulse 5—is E1. Since the E1 pulse from slicer 20 coincides with an $\bar{x}$ state of flip-flop 25, neither AND-gates 26 nor 27 have outputs. This shows there was no error.

This next pulse 6 is an M pulse. Flip-flop 25 therefore changes state to state $x$. A single M pulse is an odd number of M pulses. Therefore the next extreme level pulse must be the opposite from the previous extreme level pulse 5 (E1), or E2. Pulse 7 is in fact E2, coinciding with the prediction of flip-flop 25, which is in state $x$. Under these circumstances, again neither AND-gates 26 nor 27 have outputs because there has been no error.

M pulse 8 changes flip-flop 25 to state $\bar{x}$. Similarly, M pulses 12, 13, and 14 change flip-flop 25 three times, ending in state $x$. Pulse 15, as discussed earlier, is an erroneous pulse. The odd number of M pulses preceding it predict that is should be the opposite from the previous extreme level (E1) pulse 11, or E2. But in fact pulse 15 is E1. Flip-flop 25 is in state $x$. The E1 pulse therefore coincides with the $x$ state of flip-flop 25 and this produces an output from AND-gate 26 to indicate an error. The error signal passes through OR-gate 28 and OR-gate 24 to change the state of flip-flop 25 to $\bar{x}$. Now the error has been signaled (from the OR-gate 28) and state of flip-flop 25 has been changed (through OR-gate 24) to again put it in phase with the data. The next E1 pulse 16 will therefore check in as correct without indicating an error. But one error will have been indicated at pulse 15. As long as the pulses are correct, OR-gate 28 will have no output signals, until the next error.

Normally, a data transmission system can tolerate a certain error level. When this tolerated level is exceeded, steps must be taken to correct the cause of the errors. The tolerable error level may be ascertained by step counter 29. Suppose that the system can tolerate up to 5 errors per second. Step counter 29 then counts to five before having an output. A clock generator is connected to the reset input of step counter 29. This clock pulse generator sends clock pulses to the step counter every second. Such pulses reset the counter to zero. Thus, if less than five errors have occurred during the one second interval between resettings (the tolerable error level), step counter 29 will have no output signal. However, as soon as the fifth error signal appears at the input of counter 29 from the output of OR-gate 28 between two resettings, step counter 29 will have an output. This output indicates that the transmitted data has an error level above the tolerable, or threshold level. A warning signal may thus be flashed to the operator. Or, if desired, the error signal can automatically cause the retransmission of a previous block of data containing the errors. The latter application is important in transmission of critical data, such as inventories, payrolls, and the like.

As will be apparent to the skilled practitioner, many modifications may be made in the preferred embodiment of the invention described above without departing from the spirit and scope of the invention. Therefore the only limitations to be placed on that scope are those expressed in the claims which follow.

What is claimed is:

1. Apparatus for detecting errors in data transmitted in the form of a signal having pulses of three discrete amplitude levels including one mean level and two extreme levels, wherein the same extreme level pulse as the previous extreme level pulse normally follows an intervening series of an even number of successive mean level pulses, and the opposite extreme level pulse from the previous extreme level pulse normally follows an intervening series of an odd number of successive mean level pulses, which comprises:

(a) a pair of slicers, each having two output terminals, one positive and the other negative, the first slicer having an output on the positive terminal only upon receipt of a pulse of one of said two extreme levels, and the second slicer having an output on the positive terminal only upon receipt of a pulse of the other of said two extreme levels, said slicers otherwise having output on the negative terminals;

(b) a means connecting the negative terminals of both slicers to the inputs of a first AND-gate;

(c) a flip-flop having a complement input and two complementary outputs;

(d) a means connecting the output of said first AND-gate, which indicates the receipt of a mean level pulse, to the complement input of said flip-flop;

(e) second and third AND-gates;

(f) a means connecting one output of said flip-flop to one input of said second AND-gate, and the other input of said second AND-gate to the positive output of the first slicer;

(g) a means connecting the other output of said flip-flop to one input of said third AND-gate, and the other input of said third AND-gate to the positive output of the second slicer; and (h) a means for indicating an error when one of said second and third AND-gates has an output, said error indicating means also being connected to the complement input of said flip-flop.

2. The apparatus for detecting errors of claim 1 further defined by the output of said first AND-gate and said error indicating means being connected to the complement input of said flip-flop through an OR-gate.

3. The apparatus for detecting errors of claim 1 further defined by said error indicating means including an OR-gate having one input connected to the output of said second AND-gate and another input connected to the output of said third AND-gate, said OR-gate having an output indicating an error.

4. Apparatus for detecting errors in data transmitted in the form of a signal having pulses of three discrete amplitude levels including one mean level and two extreme levels, wherein the same extreme level pulse as the previous extreme level pulse normally follows an intervening series of an even number of successive mean level pulses, and the opposite extreme level pulse from the previous extreme level pulse normally follows an intervening series of an odd number of successive mean level pulses, which comprises:

(a) a pair of slicers, each having two output terminals, one positive and the other negative, the first slicer having an output on the positive terminal only upon receipt of a pulse of one of said two extreme levels, and the second slicer having an output on the positive terminal only upon receipt of a pulse of the other of said two extreme levels, said slicers otherwise having output on the negative terminal;

(b) a means connecting the negative terminals of both slicers to the inputs of a first AND-gate;

(c) a flip-flop having a complement input and two complementary outputs;

(d) a first OR-gate;

(e) a means connecting the output of said first AND-gate, which indicates the receipt of a mean level pulse, to an input of said first OR-gate;

(f) means connecting the output of said first OR-gate to the complement input of said flip-flop;

(g) second and third AND-gates;

(h) a means connecting one output of said flip-flop to one input of said second AND-gate, and the other input of said second AND-gate to the positive output of the first slicer;

(i) a means connecting the other output of said flip-flop to one input of said third AND-gate, and the other input of said third AND-gate to the positive output of the second slicer; and (j) a second OR-gate having one input connected to the outputs of each of said second and third AND-gates, and an output connected to an input of said first OR-gate, said second OR-gate indicating an error whenever it has an output.

5. The apparatus for detecting errors of claim 4, further defined by said second OR-gate having its output connected to a step counter which is reset periodically, said step counter having an output when it counts that the number of error signals from said second OR-gate has reached a predetermined value between resettings.

References Cited by the Examiner

UNITED STATES PATENTS

| | | | |
|---|---|---|---|
| 3,048,819 | 8/1962 | Helder et al. | 340—146.1 |
| 3,061,814 | 10/1962 | Crater | 340—146.1 |

MALCOLM A. MORRISON, *Primary Examiner.*

ROBERT C. BAILEY, *Examiner.*

M. P. ALLEN, M. P. HARTMAN, *Assistant Examiners.*